United States Patent
Kashihara et al.

(10) Patent No.: US 12,552,488 B2
(45) Date of Patent: Feb. 17, 2026

(54) SADDLE-RIDE TYPE VEHICLE

(71) Applicant: KAWASAKI MOTORS, LTD., Akashi (JP)

(72) Inventors: Takeshi Kashihara, Akashi (JP); Taro Iwamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 578 days.

(21) Appl. No.: 18/078,815

(22) Filed: Dec. 9, 2022

(65) Prior Publication Data

US 2023/0182851 A1  Jun. 15, 2023

(30) Foreign Application Priority Data

Dec. 14, 2021  (JP) ................................ 2021-202466

(51) Int. Cl.
  *B62K 11/04*  (2006.01)
  *B60K 11/02*  (2006.01)
  *B62J 37/00*  (2006.01)

(52) U.S. Cl.
  CPC .............. *B62K 11/04* (2013.01); *B60K 11/02* (2013.01); *B62J 37/00* (2013.01)

(58) Field of Classification Search
  CPC ...... B62K 11/04; B62K 25/283; B60K 11/02; B60K 15/03504; B62J 37/00; B62J 40/00; B62J 45/00; B62J 41/00; B62J 43/16; B62J 43/28; F01P 2050/16; F01P 11/029; B60Y 2410/10; B60Y 2200/12; B62M 7/02

See application file for complete search history.

(56) References Cited

U.S. PATENT DOCUMENTS

| | | | |
|---|---|---|---|
| 2009/0058030 A1 | 3/2009 | Fujita et al. | |
| 2011/0073399 A1* | 3/2011 | Seki | B60K 15/03504 60/299 |
| 2014/0060955 A1* | 3/2014 | Kono | B62K 11/00 180/291 |

FOREIGN PATENT DOCUMENTS

| | | | | |
|---|---|---|---|---|
| CN | 102066735 A | * | 5/2011 | ......... F02M 25/0854 |
| CN | 103318346 A | * | 9/2013 | .......... F02M 25/089 |
| CN | 104743015 A | * | 7/2015 | .............. B62J 37/00 |
| CN | 105579337 A | * | 5/2016 | .............. B62J 40/00 |
| CN | 106379453 B | * | 11/2019 | .............. B62K 11/04 |
| CN | 111204395 A | * | 5/2020 | .............. B62J 45/00 |
| CN | 111405999 A | * | 7/2020 | ............. F02M 25/08 |
| CN | 110775182 B | * | 5/2021 | .............. B62J 37/00 |
| CN | 113460210 A | | 10/2021 | |
| CN | 215513975 U | * | 1/2022 | .............. B62J 37/00 |
| JP | A-S60-072375 | | 5/1985 | |
| JP | H11-059542 A | | 3/1999 | |
| JP | 2009-056895 A | | 3/2009 | |
| JP | 5739292 B2 | | 6/2014 | |
| JP | 2018103873 A | * | 7/2018 | .............. F02B 61/02 |

(Continued)

*Primary Examiner* — Drew J Brown (74) *Attorney, Agent, or Firm* — PROCOPIO, CORY, HARGREAVES & SAVITCH LLP (57) ABSTRACT

There is provided a saddle-ride type vehicle including: a rear wheel; a vehicle body frame including a pivot shaft extending in a vehicle width direction; a swing arm connecting the pivot shaft and the rear wheel; and a housing structure having a housing space of fluid inside the housing structure. The housing structure is disposed between the pivot shaft and the rear wheel and at a position overlapping the swing arm in a side view of the saddle-ride type vehicle.

16 Claims, 9 Drawing Sheets

(56) References Cited

FOREIGN PATENT DOCUMENTS

| JP | 6779946 B2 | * | 11/2020 | ............... | B62J 35/00 |
| JP | 2023027852 A | * | 3/2023 | ................ | B60K 6/40 |
| WO | WO-2020121487 A1 | * | 6/2020 | ............ | B60K 15/035 |

* cited by examiner

SADDLE-RIDE TYPE VEHICLE

CROSS-REFERENCE TO RELATED APPLICATIONS

This application is based on and claims priority under 35 USC 119 from Japanese Patent Application No. 2021-202466 filed on Dec. 14, 2021, the contents of which are incorporated herein by reference.

TECHNICAL FIELD

The present disclosure relates to a saddle-ride type vehicle such as a motorcycle.

BACKGROUND ART

There is known a saddle-ride type vehicle (motorcycle) disclosed in JP5739292B. The saddle-ride type vehicle includes an engine, a fuel tank that stores fuel to be supplied to the engine, and a canister that adsorbs evaporated fuel gas generated inside the fuel tank. The evaporated fuel gas adsorbed by the canister is supplied to the engine through a purge pipe.

The canister generally includes an adsorbent that adsorbs evaporated fuel gas, and a housing that contains the adsorbent therein. In other words, the canister is a housing structure having a space of a predetermined volume for containing a fluid therein.

It is desirable that the housing structure as described above should be protected from a foreign matter or the like that may fly to the housing structure during traveling. However, if the housing structure is disposed in a dedicated space covered with a cover or the like, for example, in order to protect the housing structure, an increase in a size of the saddle-ride type vehicle is caused, which is not preferable.

SUMMARY OF INVENTION

The present disclosure provides a saddle-ride type vehicle which can prevent an increase in the size thereof while appropriately protecting the housing structure.

According to an illustrative aspect of the present disclosure, a saddle-ride type vehicle includes: a rear wheel; a vehicle body frame including a pivot shaft extending in a vehicle width direction; a swing arm connecting the pivot shaft and the rear wheel; and a housing structure having a housing space of fluid inside the housing structure. The housing structure is disposed between the pivot shaft and the rear wheel and at a position overlapping the swing arm in a side view of the saddle-ride type vehicle.

According to the saddle-ride type vehicle of the present disclosure, it is possible to prevent an increase in a size of the saddle-ride type vehicle while appropriately protecting the housing structure.

DESCRIPTION OF EMBODIMENTS

[Vehicle Body Structure of Motorcycle]

Figure 1:
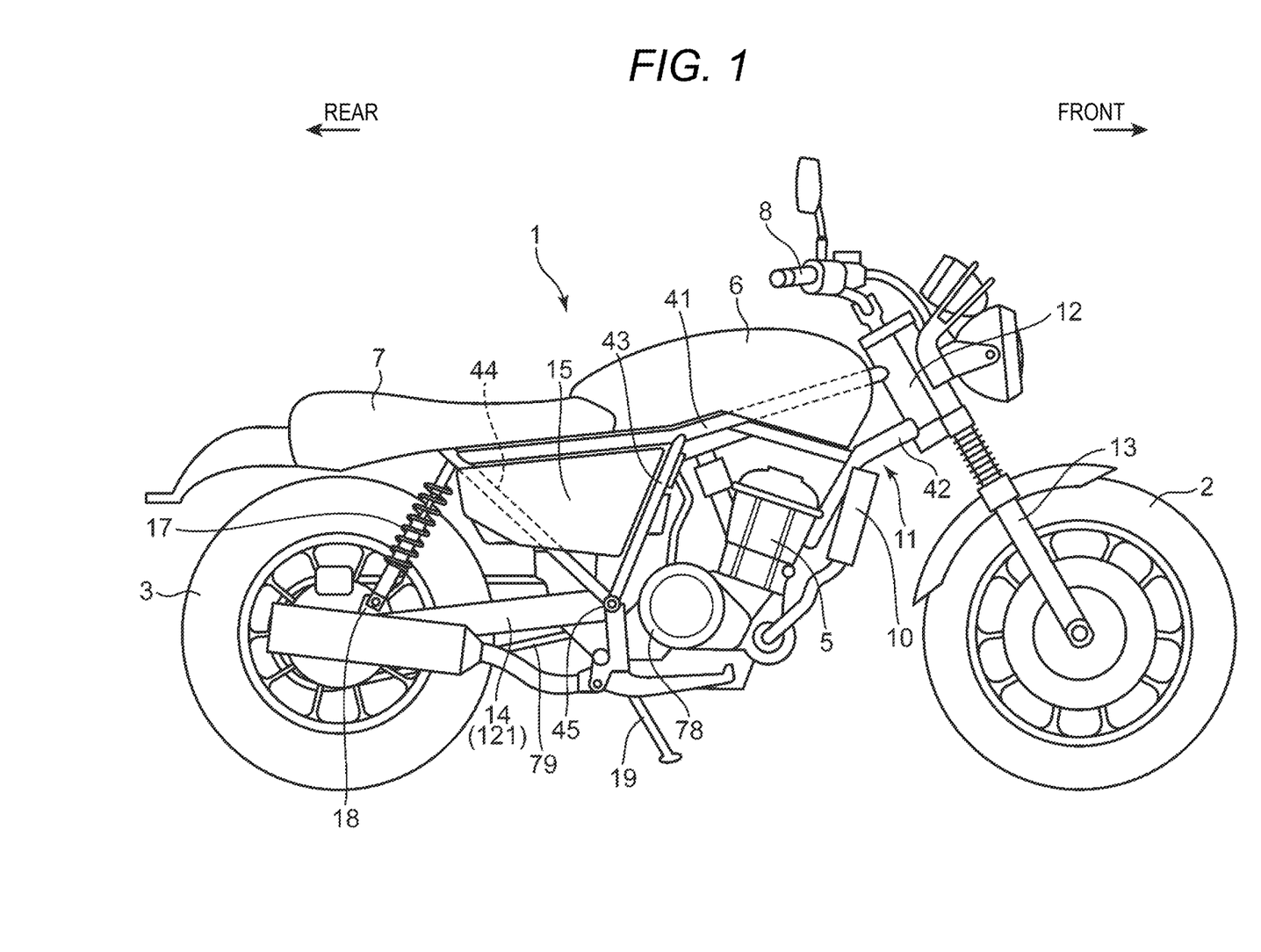
FIG. 1 is a right side view of a motorcycle according to an embodiment of the present disclosure.

FIG. 1 is a right side view of a motorcycle according to an embodiment of the present disclosure. As shown in FIG. 1, the motorcycle includes a vehicle body 1, a front wheel 2, a rear wheel 3, an engine 5, a fuel tank 6, a seat 7, and a handle 8. The front wheel 2 and the rear wheel 3 are a pair of front and rear wheels that movably support the vehicle body 1. The engine 5 is a driving source that generates a driving force for rotating the rear wheel 3, in other words, a driving force for driving the motorcycle, and is implemented with, for example, a four-cycle internal combustion engine. The fuel tank 6 is a tank that stores fuel to be supplied to the engine 5. The seat 7 is a seat on which an occupant (rider) who drives the motorcycle sits. The handle 8 is a steering handle the occupant grips when steering the front wheels 2. As described above, the motorcycle according to the present embodiment is a two-wheeled automobile that travels by the driving force of the engine 5, and is a type of saddle-ride type vehicle.

The vehicle body 1 includes a vehicle body frame 11, a head portion 12, a front fork 13, and swing arms 14. The vehicle body frame 11 is a frame structure that forms a framework of the vehicle body 1. The head portion 12 is a cylindrical member for holding the front fork 13 at a front end portion of the vehicle body frame 11. The front fork 13 is a member that connects the handle 8 and the front wheel 2. The swing arms 14 are members that connect the vehicle body frame 11 and the rear wheel 3.

The vehicle body frame 11 includes a main pipe 41, a lower pipe 42, a center pipe 43, a rear pipe 44, and a pivot shaft 45. The main pipe 41 is a pipe member extending from an upper portion of the head portion 12 while being inclined rearward and downward. The lower pipe 42 is a pipe member extending from a lower portion of the head portion 12 while being inclined rearward and downward, and is disposed so as to be inclined downward more than the main pipe 41. The center pipe 43 is a pipe member extending from an intermediate portion of the main pipe 41 while being inclined rearward and downward, and is disposed such that a distance from the main pipe 41 increases toward the rear. The rear pipe 44 is a pipe member extending from a lower end of the center pipe 43 while being inclined rearward and upward. A rear end portion (upper end portion) of the rear pipe 44 is coupled to a rear end portion of the main pipe 41. The pivot shaft 45 is a shaft member extending in a vehicle width direction, and is coupled to a front end portion of the rear pipe 44 (or a lower end portion of the center pipe 43).

The vehicle body frame 11 has a bilaterally symmetrical structure. That is, the pipe groups 41 to 44 of the vehicle body frame 11 are provided not only on a right side of the vehicle body 1 shown in FIG. 1 but also on a left side of the vehicle body 1 (see FIG. 4 described later). In other words, the vehicle body frame 11 includes a pair of main pipes 41 and a pair of lower pipes 42 that extend from the head portion 12 while branching to the left and right, a pair of rear pipes 44 that are connected to rear end portions of the main pipes 41, and a pair of center pipes 43 that connect intermediate portions of the main pipes 41 and front end portions of the rear pipes 44.

Side covers 15 are attached to side surfaces of the vehicle body 1. The side cover 15 is a cover attached to the vehicle body frame 11 so as to mainly cover a region below a front portion of the seat 7 in the side surface of the vehicle body 1.

Figure 2:
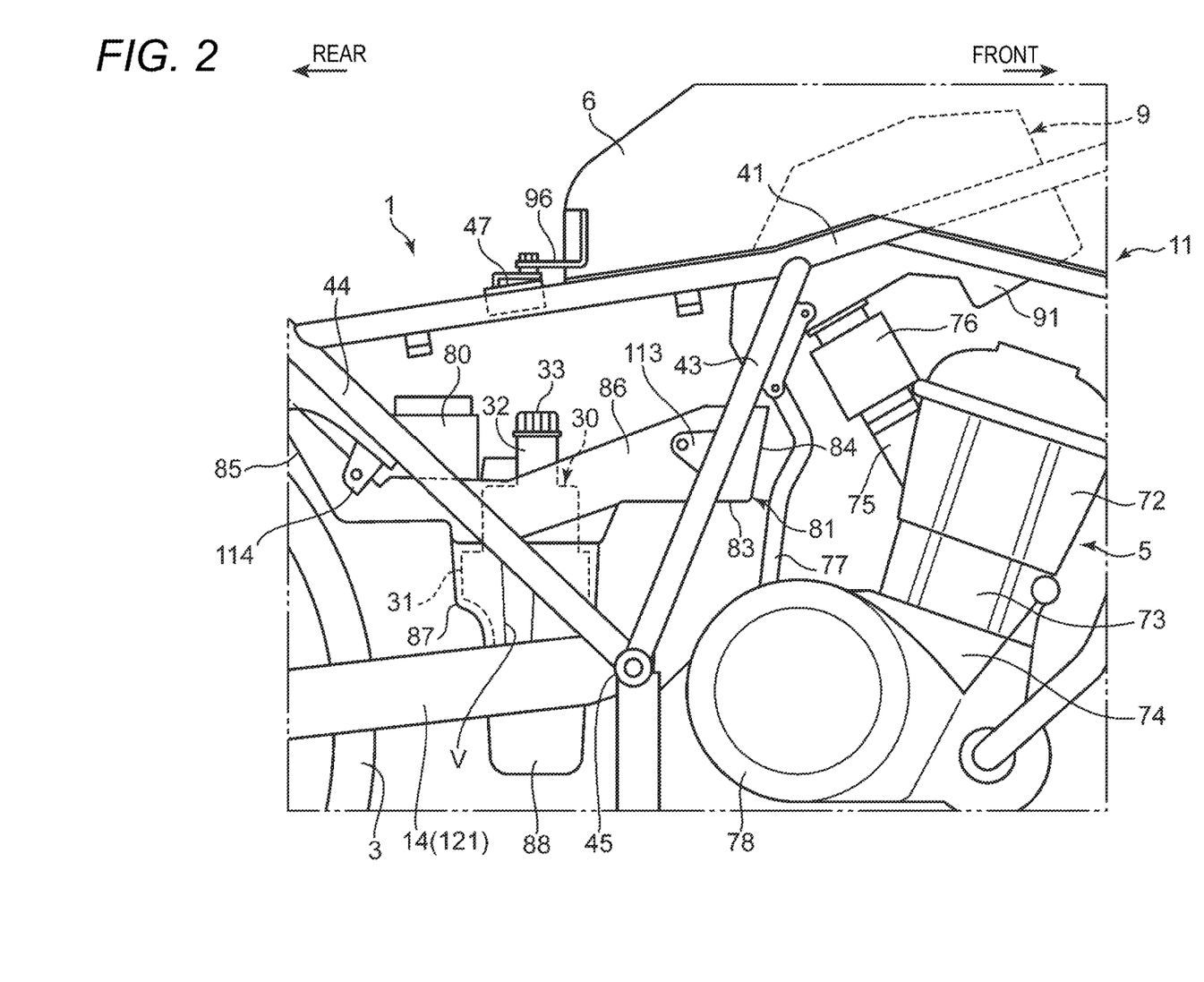
FIG. 2 is a right side view of a front-rear central portion of the motorcycle.

FIG. 2 is a right side view of a front-rear central portion of the motorcycle. In FIG. 2, the motorcycle is shown in a state in which covers including the side cover 15 and the seat 7 are removed from the vehicle body 1. As shown in FIG. 2, the vehicle body frame 11 further includes an upper cross member 47 as a reinforcing member extending in the vehicle width direction. The upper cross member 47 is a member that connects rear portions of the left and right main pipes 41 to each other.

Figure 7:
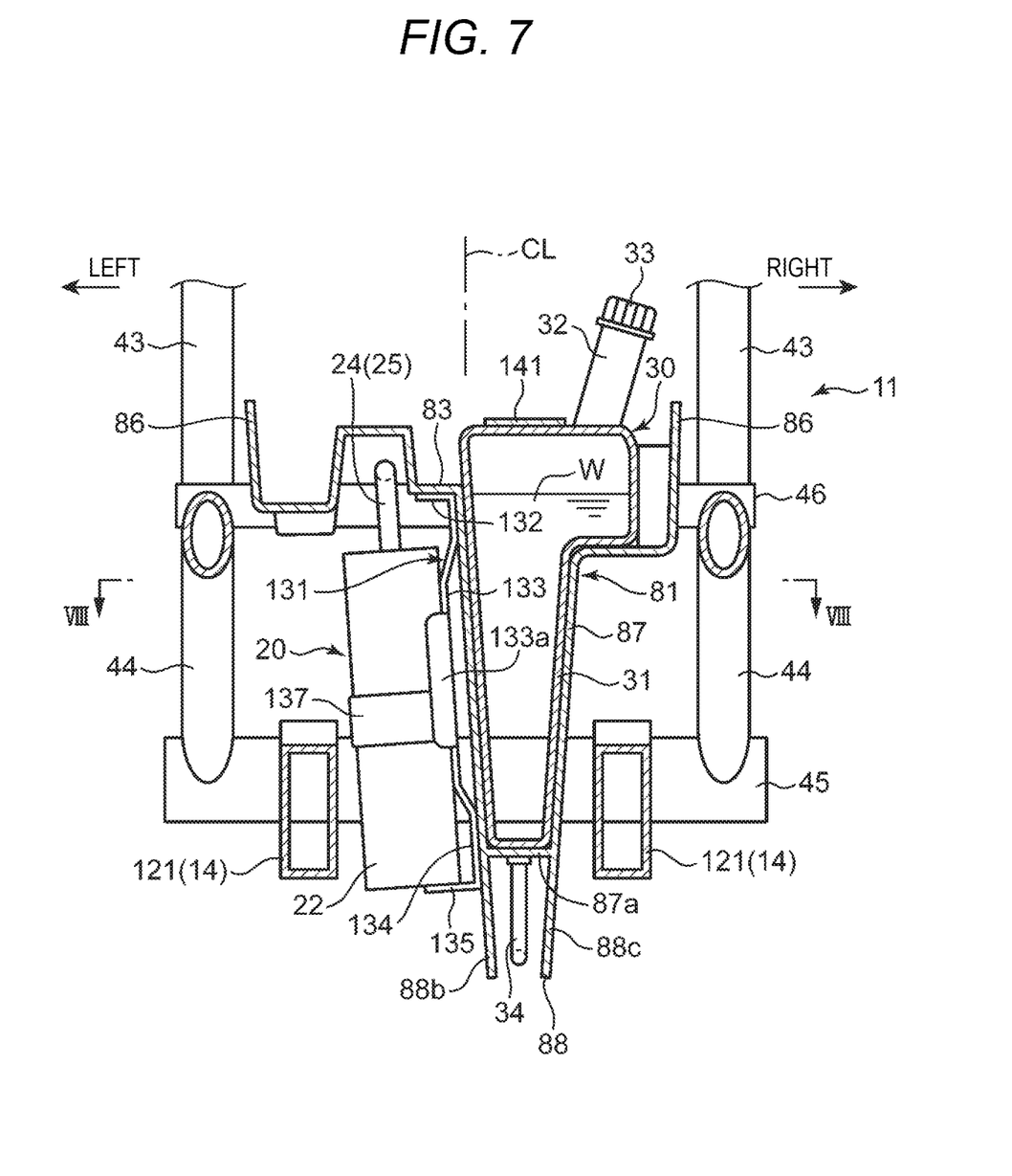
FIG. 7 is a cross-sectional view taken along line VII-VII of FIG. 4.
Figure 8:
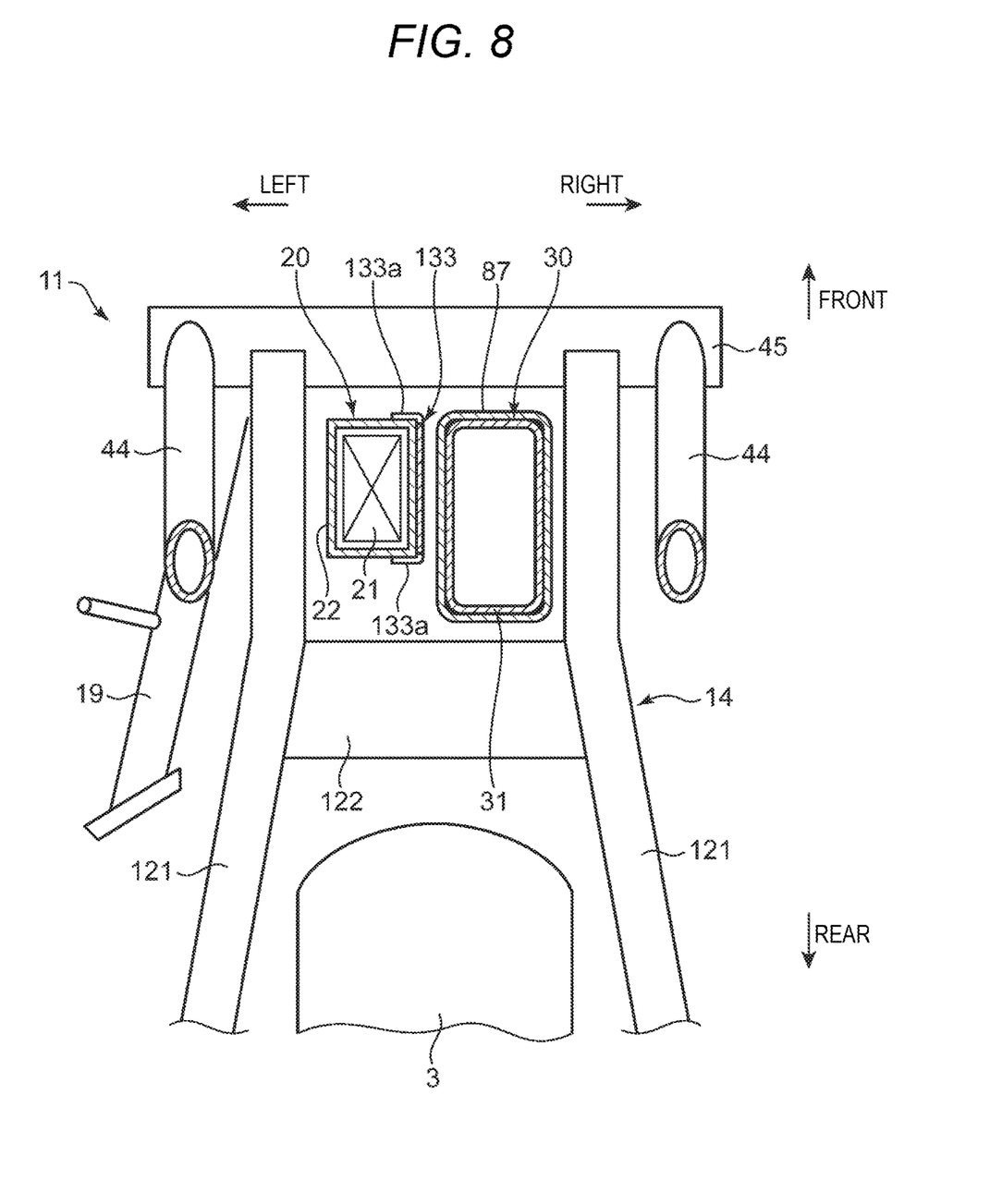
FIG. 8 is a cross-sectional view taken along line VIII-VIII of FIG. 7.

The swing arms 14 are arms that connect the vehicle body frame 11 and the rear wheel 3 and extend in a front-rear direction. As shown in FIGS. 7 and 8 to be described later, the swing arms 14 include a pair of left and right arm members 121 extending from two left and right locations of the pivot shaft 45 toward the rear wheel 3, and a cross member 122 (FIG. 8) extending in the vehicle width direction and connecting intermediate portions of the arm members 121. Each arm member 121 is pivotally supported by the pivot shaft 45 at its front end portion, so that the arm member 121 is swingable in an upper-lower direction about the pivot shaft 45. The rear wheel 3 is disposed between the pair of arm members 121, and is pivotally supported by rear end portions of the arm members 121. That is, the swing arms 14 support the rear wheel 3 so as to be swingable in the upper-lower direction with respect to the vehicle body frame 11.

Rear portions of the swing arms 14 are respectively connected to the rear end portions of the rear pipes 44 via a pair of left and right rear suspensions 17. The pair of rear suspensions 17 are shock absorbers including springs, dampers, and the like, and connect rear portions of the respective arm members 121 of the swing arms 14 and the pair of rear pipes 44 in the upper-lower direction. A lower end portion of each rear suspension 17 is connected to the arm member 121 via a bracket 18 (FIG. 1).

The front fork 13 is rotatably supported by the head portion 12 via a stem shaft (not shown). The handle 8 is attached to an upper end portion of the front fork 13, and the front wheel 2 is pivotally supported by a lower end portion of the front fork 13.

Figure 3:
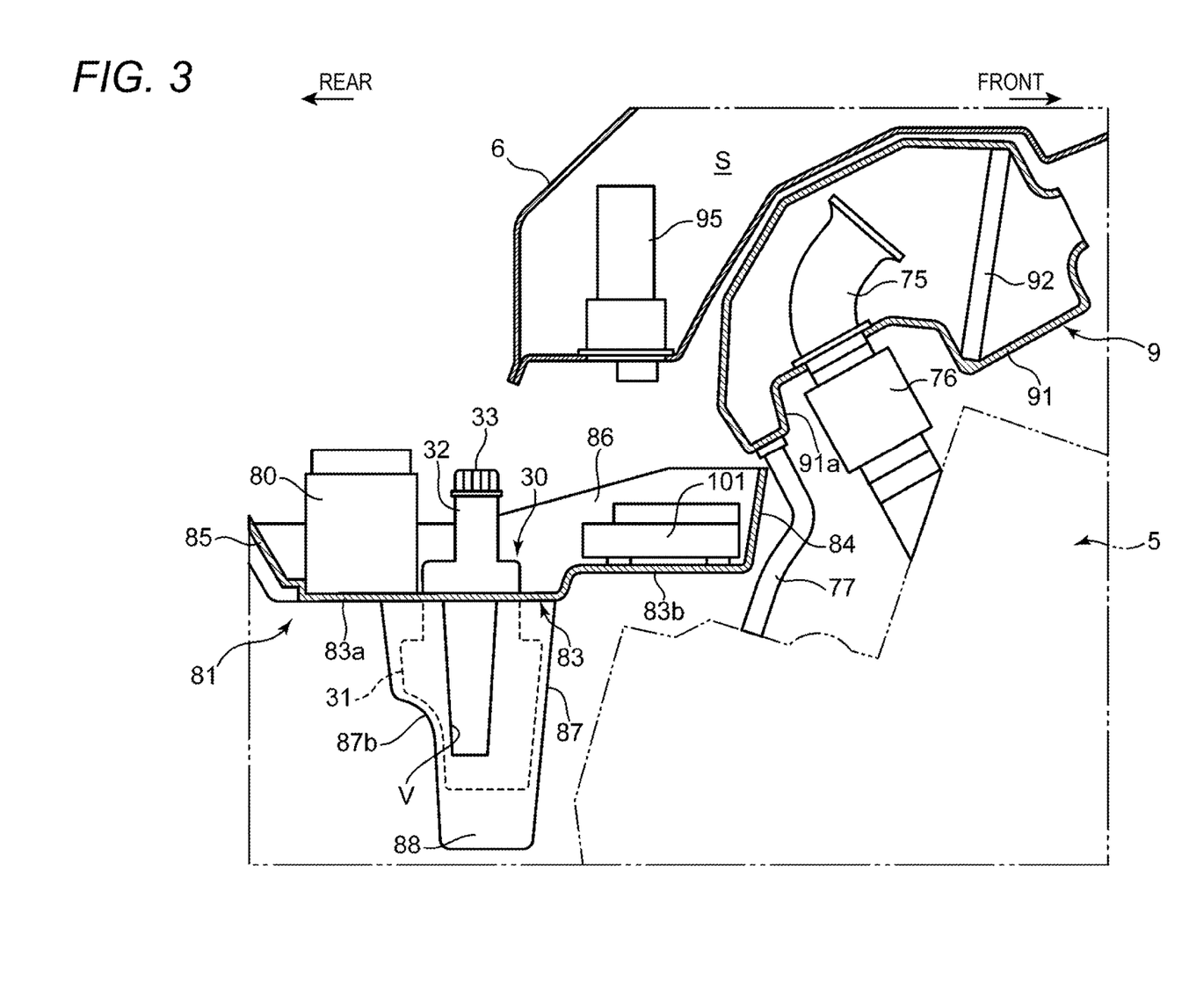
FIG. 3 is a right side cross-sectional view of the front-rear central portion of the motorcycle.

FIG. 3 is a right side cross-sectional view of the front-rear central portion of the motorcycle. As illustrated, the fuel tank 6 has a storage space S for storing fuel to be supplied to the engine 5 therein. The fuel tank 6 is supported by the vehicle body frame 11 at a front upper portion of the vehicle body 1 above the engine 5. Specifically, a rear end portion of the fuel tank 6 is fastened and fixed to the upper cross member 47 via a bracket 96 (FIG. 2). A front end portion of the fuel tank 6 is fastened and fixed to a front end portion of the main pipe 41 via a bracket (not shown). A fuel pump 95 (FIG. 3) is attached inside the fuel tank 6. The fuel pump 95 pressurizes to feed the fuel stored in the storage space S to the engine 5 through a fuel supply pipe (not shown).

Figure 4:
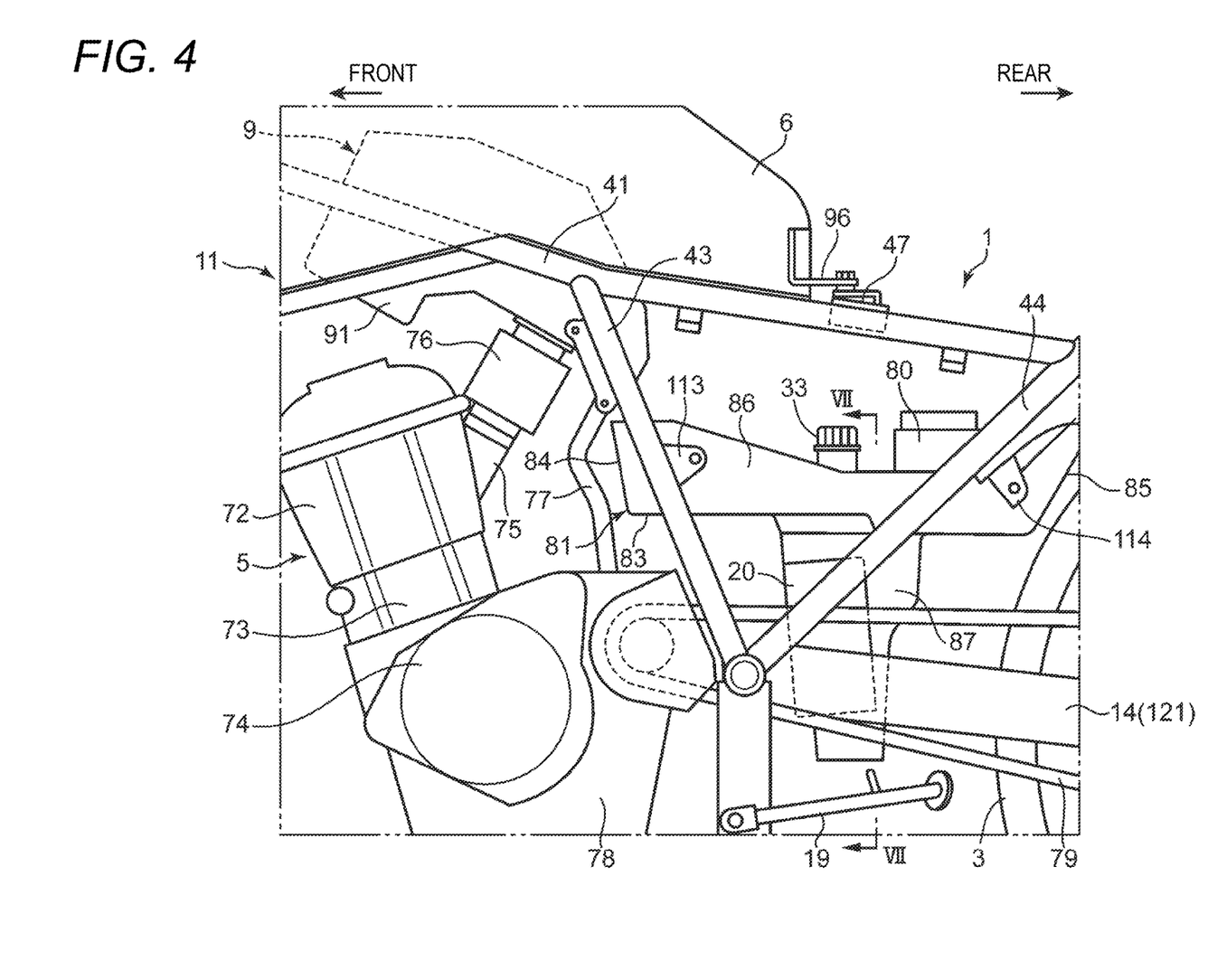
FIG. 4 is a left side view of the front-rear central portion of the motorcycle.

FIG. 4 is a left side view of the front-rear central portion of the motorcycle. As shown in FIGS. 2 and 4, the engine 5 includes a cylinder head 72, a cylinder block 73, and a crankcase 74. The cylinder head 72 and the cylinder block 73 are housings that enclose a space (cylinder) in which the fuel supplied from the fuel tank 6 is combusted. The crankcase 74 is a case that rotatably houses a crankshaft, which is an output shaft of the engine 5. The rotation of the crankshaft, that is, the output rotation of the engine 5 is transmitted to the rear wheel 3 via a transmission 78 and a chain 79 (FIG. 4). The engine 5 is supported by the vehicle body frame 11 by fixing the cylinder head 72 and the like between a front portion of the main pipe 41 and the lower pipe 42.

A radiator 10 (FIG. 1) is disposed in front of the engine 5. The radiator 10 is a heat exchanger that cools cooling water introduced into the engine 5 by heat exchange.

As shown in FIGS. 2 to 4, an air cleaner 9 is disposed between the engine 5 and the fuel tank 6. The air cleaner 9 removes a foreign matter in the intake air introduced into the engine 5, and includes a cleaner case 91 and a filter 92 provided inside the cleaner case 91 (see FIG. 3). An intake pipe 75 extending from the cylinder head 72 is introduced into the cleaner case 91. That is, the intake pipe 75 allows communication between an inside of the cleaner case 91 and the cylinder so that the intake air filtered by the filter 92 can be introduced into a cylinder of the engine 5. A throttle valve 76 for adjusting a flow rate of the intake air is disposed in the middle of the intake pipe 75.

The air cleaner 9 and the crankcase 74 are connected to each other by a blowby hose 77. The blowby hose 77 is a hose for recirculating un-combusted gas inside the crankcase 74 to the intake pipe 75. The cleaner case 91 of the air cleaner 9 includes an extension portion 91*a* (FIG. 3) protruding downward from a rear end portion thereof, and an upper end (downstream end) of the blowby hose 77 is connected to the extension portion 91*a*.

The seat 7 is attached to an upper surface of a rear portion of the vehicle body 1 immediately behind the fuel tank 6. Specifically, the seat 7 is attached to the rear portion of the main pipe 41 so as to cover a region including an upper side of the rear wheel 4 from above.

As shown in FIGS. 1 and 4, a side stand 19 is attached to a lower left portion of the vehicle body 1. The side stand 19 is a stand that is used when parking the motorcycle, and is displaceable between a use state (FIG. 1) in which the side stand 19 extends downward from the lower left portion of the vehicle body 1 and a storage state (FIG. 4) in which the side stand 19 is raised rearward with respect to the use state. The side stand 19 displaced to the use state supports the vehicle body in a state in which the vehicle body is inclined to the left side.

As shown in FIGS. 2 to 4, a battery 80 is disposed between the engine 5 and the rear wheel 3. The battery 80 is a capacitor that stores electric power supplied from a generator (not shown) that generates electric power by the driving force of the engine 5. The battery 80 is supported by a battery case 81 fixed to the vehicle body frame 11 between the engine 5 and the rear wheel 3. The battery case 81 corresponds to a "case body" in the present disclosure.

The battery case 81 is an integrally molded product made of resin, and includes a bottom wall 83, a front wall 84, a rear wall 85, a pair of left and right side walls 86, and a bottom container portion 87. The bottom wall 83 is a wall portion that supports the battery 80 from below. Specifically, as shown in FIG. 3, the bottom wall 83 includes a battery mounting portion 83*a* on which the battery 80 is mounted, and an extension portion 83*b* extending forward from the battery mounting portion 83*a*. The front wall 84 is a wall portion extending upward from a front end of the bottom wall 83 (extension portion 83b). The rear wall 85 is a wall portion that extends from a rear end of the bottom wall 83 (battery mounting portion 83a) while being inclined upward and rearward. The pair of side walls 86 are wall portions that protrude upward from left and right side edges of the bottom wall 83, and extend in the front-rear direction from both end portions of the front wall 84 to both end portions of the rear wall 85. The bottom container portion 87 protrudes downward from the bottom wall 83, and is formed in a bottomed cylindrical shape having a bottom portion 87a (FIG. 6) as a bottom. The bottom container portion 87 functions as a container that houses a reservoir tank 30, which will be described later. The bottom container portion 87 corresponds to a "tank housing portion" in the present disclosure.

The battery case 81 is fixed to the vehicle body frame 11 via first support pieces 113 and second support pieces 114 shown in FIGS. 2 and 4. The first support piece 113 protrudes rearward from an intermediate portion of the center pipe 43 in the upper-lower direction, and the second support piece 114 protrudes downward from a rear portion of the rear pipe 44. The battery case 81 is fixed to the vehicle body frame 11 between the engine 5 and the rear wheel 3 by fastening the side walls 86 of the battery case 81 to the first and second support pieces 113 and 114 via bolts or the like.

As mainly shown in FIG. 3, an upper end portion of the front wall 84 of the battery case 81 is close to the extension portion 91a of the cleaner case 91. That is, the battery case 81 is fixed to the vehicle body frame 11 in such a positional relation that the upper end portion of the front wall 84 is close to a lower end of a rear portion of the air cleaner 9.

A control unit 101 (FIG. 3) is mounted on the extension portion 83b of the bottom wall 83. The control unit 101 is a device that controls the engine 5, and includes electronic devices such as a processor and a memory, and a power supply circuit.

[Mounting Structure of Canister and Reservoir Tank]

Figure 5:
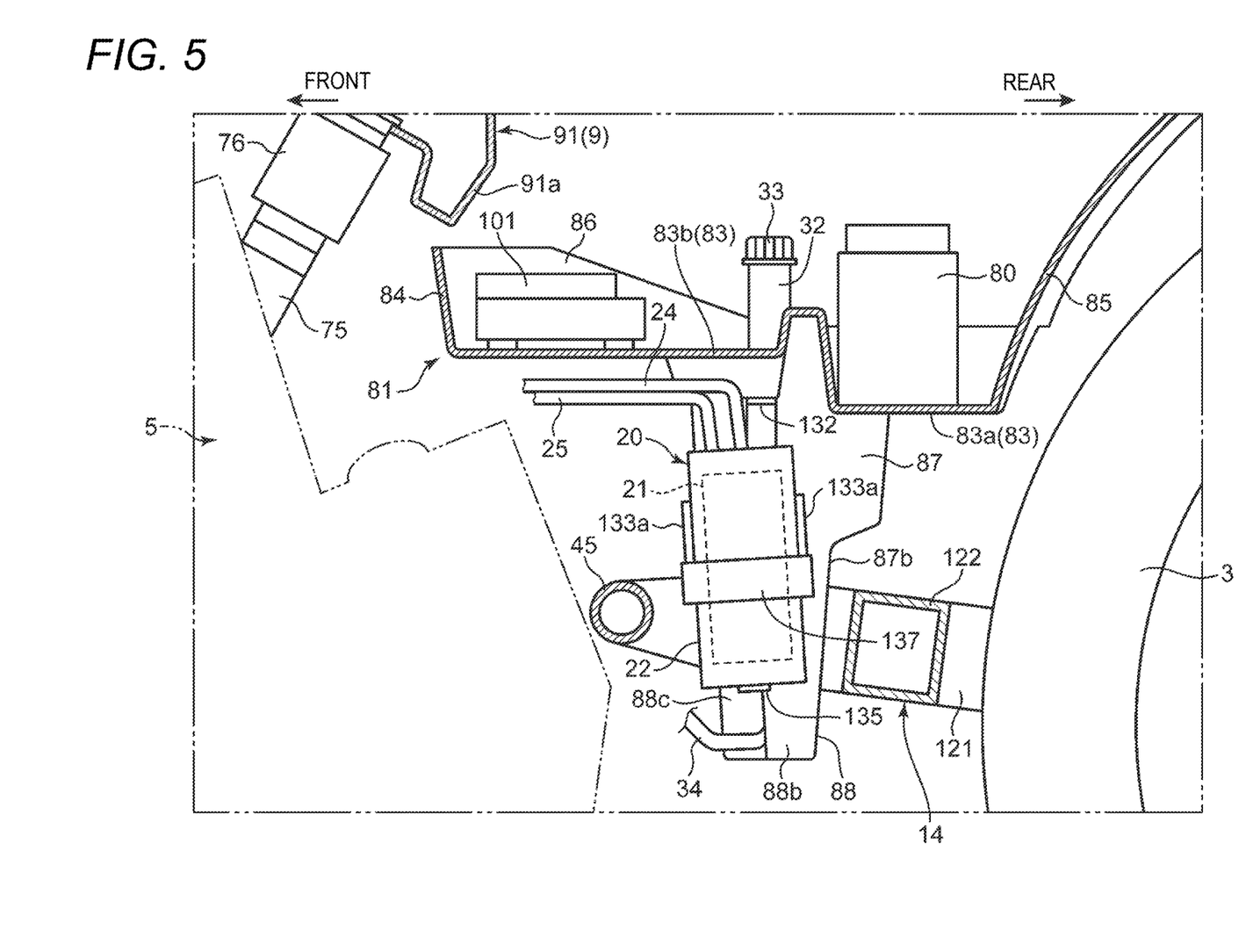
FIG. 5 is a left side cross-sectional view of the front-rear central portion of the motorcycle.
Figure 6:
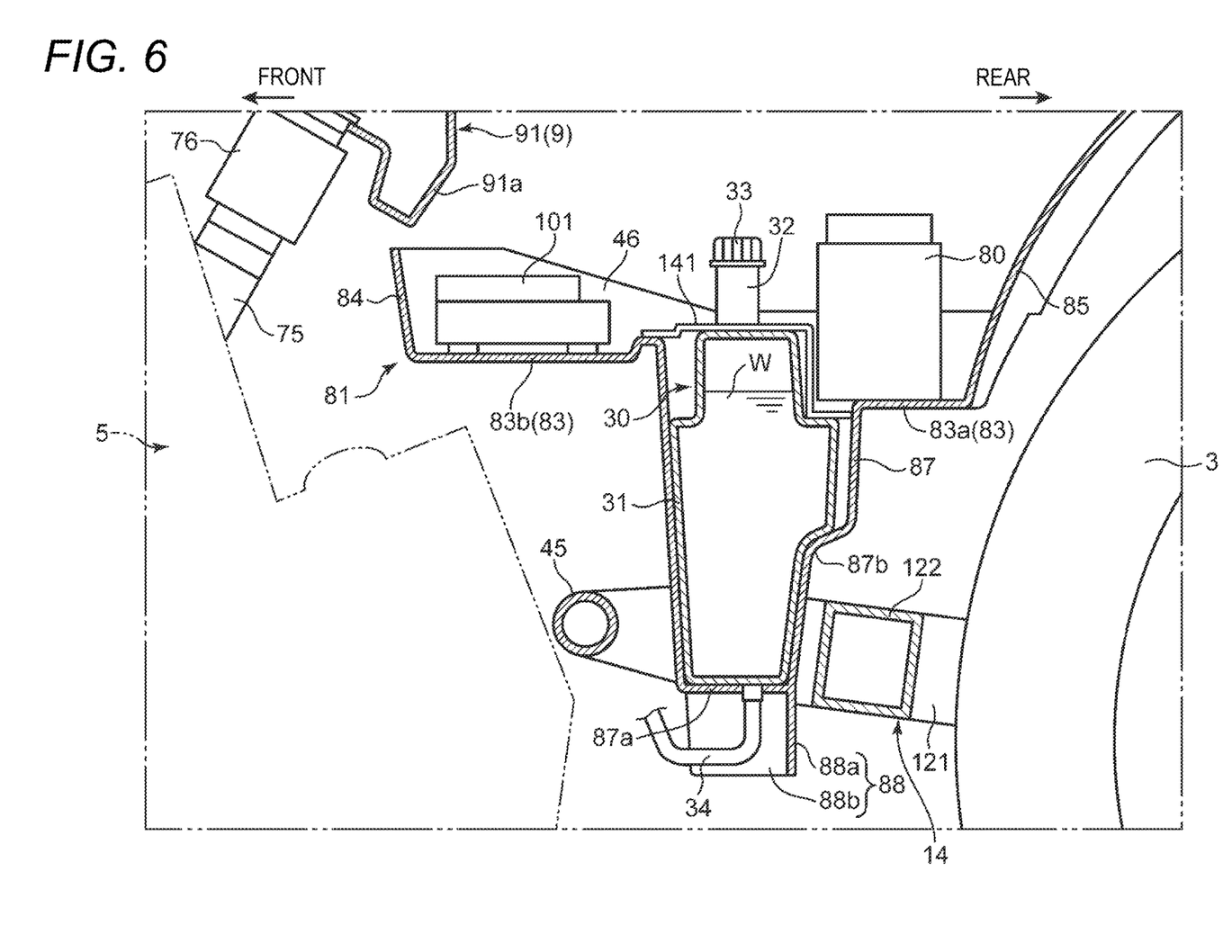
FIG. 6 is a left side cross-sectional view of the front-rear central portion of the motorcycle, and is a cross-sectional view taken along a cutting plane on a right side of FIG. 5.

FIGS. 5 and 6 are left side cross-sectional views of the front-rear central portion of the motorcycle. Positions of cutting planes in FIGS. 5 and 6 are different from each other, and the cutting plane in FIG. 6 is set on the right side of the cutting plane in FIG. 5. FIG. 7 is a cross-sectional view taken along line VII-VII of FIG. 4. FIG. 8 is a cross-sectional view taken along line VIII-VIII of FIG. 7. As shown in FIGS. 2 to 8, a canister 20 and the reservoir tank 30 are attached to the battery case 81. The canister 20 is a collector that collects evaporated fuel gas, which is an evaporated component of a fuel. The reservoir tank 30 is a tank that stores cooling water W (FIG. 6) used in the engine 5.

The canister 20 and the reservoir tank 30 are separately disposed inside and outside the bottom container portion 87 of the battery case 81. That is, the reservoir tank 30 is disposed inside the bottom container portion 87, and the canister 20 is disposed outside the bottom container portion 87. Hereinafter, detailed structures of the canister 20 and the reservoir tank 30 will be described in order.

First, the reservoir tank 30 will be described in detail. As mainly shown in FIGS. 6 and 7, the reservoir tank 30 includes a tank body 31, a replenishment port portion 32, and a cap 33. The entire reservoir tank 30 has an elongated shape in the upper-lower direction. That is, a dimension of the reservoir tank 30 in the upper-lower direction is larger than both a dimension in the vehicle width direction and a dimension in the front-rear direction. The tank body 31, the replenishment port portion 32, and the cap 33 are all made of resin.

The tank body 31 is a transparent or translucent hollow body having a housing space for the cooling water W therein. The tank body 31 has a shape that can be inserted into the bottom container portion 87 of the battery case 81 from above. When the tank body 31 is inserted into the bottom container portion 87 from above, most of the tank body 31 except for an upper side portion thereof is housed inside the bottom container portion 87. Here, the bottom container portion 87 is formed such that a cross-sectional area thereof decreases as going downward. This is to facilitate the removal of the battery case 81 made of resin from a mold when the resin battery case 81 is molded. A recessed portion 87b (FIG. 6) recessed forward is formed in a lower rear surface of the bottom container portion 87. This is to avoid interference between the swing arms 14 which swing during traveling and the cross member 122. The tank body 31 has an outer shape substantially along an inner surface of the bottom container portion 87 having such a shape such that a gap with the bottom container portion 87 is as small as possible. That is, the tank body 31 is formed such that a cross-sectional area thereof decreases as going downward, and has a recessed portion corresponding to the recessed portion 87b of the bottom container portion 87 on a lower rear surface thereof.

The replenishment port portion 32 is a cylindrical body protruding upward from the tank body 31. Both ends of the replenishment port portion 32 are opened so that the cooling water W can be supplied through the replenishment port portion 32. As shown in FIG. 7, the replenishment port portion 32 is connected to the tank body 31 in a posture inclined to the right side. That is, the replenishment port portion 32 is inclined such that an upper end thereof is positioned on an outer side (right side) in the vehicle width direction with respect to a lower end thereof.

The cap 33 is a cap that closes an upper end opening of the replenishment port portion 32, and is detachably attached to an upper end portion of the replenishment port portion 32. The supply of the cooling water W to the tank body 31 is performed in a state in which the cap 33 is removed from the replenishment port portion 32.

Here, the bottom container portion 87 that houses the reservoir tank 30 is formed at a position deviated to a right side in the battery case 81. Therefore, the reservoir tank 30 is disposed such that a center portion thereof is offset to the right side with respect to a vehicle width center CL (FIG. 7) of the vehicle body 1. In the present embodiment, as described above, the replenishment port portion 32 is formed so as to be inclined to the right side. Therefore, the upper end of the replenishment port portion 32 is disposed at a position farther to the right side from the vehicle width center CL. In the present embodiment, since the side stand 19 (FIG. 4) is attached to a left side portion of the vehicle body 1, the center portion of the reservoir tank 30 is positioned on the opposite side of the side stand 19 with respect to the vehicle width center CL. In other words, the reservoir tank 30 is disposed so as to be offset to the opposite side of the side stand 19 with respect to the vehicle width center CL.

As mainly shown in FIG. 6, a pressing plate 141 for fixing the reservoir tank 30 is attached to the battery case 81. The pressing plate 141 is a plate-shaped member formed so as to extend in the front-rear direction through a position immediately above the tank body 31. Both front and rear end portions of the pressing plate 141 are respectively fixed to the battery case 81 at the front and rear of the reservoir tank 30. That is, the holding plate 141 holds the reservoir tank 30 at a fixed position in the bottom container portion 87 by sandwiching the tank body 31 between the pressing plate 141 and the bottom portion 87*a* of the bottom container portion 87.

As shown in FIGS. 2 and 3, a notch V is formed in a side surface on a right side (outer side in the vehicle width direction) of the bottom container portion 87. The notch V is a notch for checking a water level of the cooling water W in the reservoir tank 30 (tank body 31). That is, when the battery case 81 is viewed from the right side of the vehicle body 1, the tank body 31 inside the bottom container portion 87 can be visually recognized through the notch V. As described above, since the tank body 31 is transparent or translucent, the water level of the cooling water W stored inside the tank body 31 can also be checked by visually recognizing the tank body 31 through the notch V. At this time, in order to easily determine whether the water level of the cooling water W is high or low, it is desirable to scale a part of the tank body 31 exposed by the notch V.

As shown in FIGS. 6 and 7, a cooling water hose 34 is connected to a bottom portion of the tank body 31. The cooling water hose 34 is a hose that connects the radiator 10 (FIG. 1) and the reservoir tank 30. An end portion of the cooling water hose 34 on the reservoir tank 30 side is connected to the bottom portion of the tank body 31 so as to communicate with the storage space of the cooling water W (inside of the tank body 31). The cooling water W in the reservoir tank 30 is supplied to the radiator 10 through the cooling water hose 34. The cooling water W supplied to the radiator 10 is circulated between the engine 5 and the radiator 10. In other words, the reservoir tank 30 is a housing structure having a housing space for the cooling water W (fluid) to be supplied to the engine 5.

Figure 9:
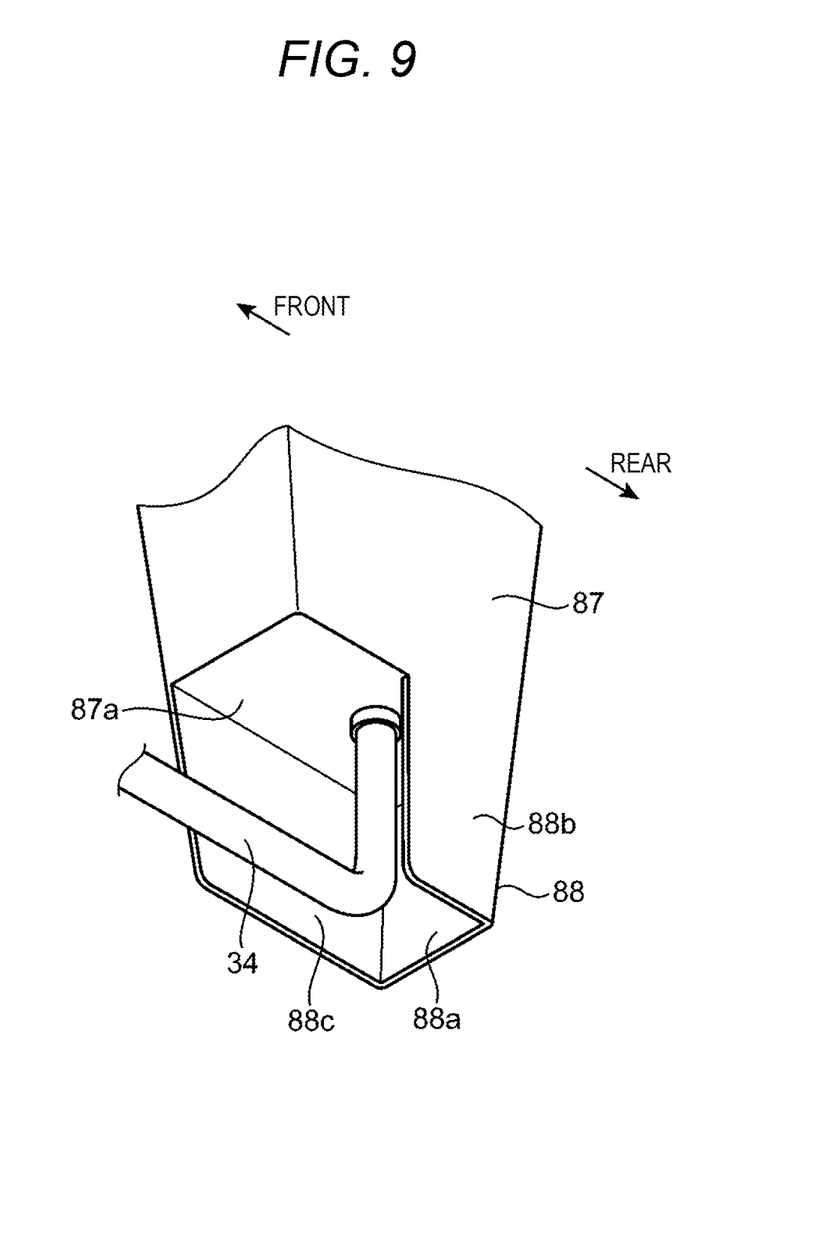
FIG. 9 is an enlarged perspective view showing a lower portion of a bottom container portion in a battery case.

An extending portion 88 is formed on a lower side of the bottom container portion 87. As shown in FIG. 9, the extending portion 88 is formed to protrude downward from a peripheral edge of the bottom portion 87*a* of the bottom container portion 87 so as to cover a periphery of the cooling water hose 34. That is, the cooling water hose 34 is routed so as to extend downward from the bottom portion 87*a* of the bottom container portion 87 and then turn forward. The extending portion 88 is formed so as to cover a portion of the cooling water hose 34 extending downward from the bottom portion 87*a* from a rear side and both left and right sides. Specifically, the extending portion 88 includes a rear guard wall 88*a* positioned behind the cooling water hose 34, and a left guard wall 88*b* and a right guard wall 88*c* positioned on the left and right of the cooling water hose 34.

Next, the canister 20 will be described in detail. As mainly shown in FIGS. 5 and 8, the canister 20 includes an adsorbent 21 made of activated carbon or the like that adsorbs evaporated fuel gas, and a housing 22 made of resin that houses the adsorbent 21 therein. The entire canister 20 has an elongated shape in the upper-lower direction. That is, a dimension of the canister 20 in the upper-lower direction is larger than both a dimension in the vehicle width direction and a dimension in the front-rear direction.

As shown in FIG. 5, a first purge pipe 24 and a second purge pipe 25 are connected to an upper surface of the housing 22 of the canister 20. The first purge pipe 24 is a pipe that connects the fuel tank 6 and the canister 20. The second purge pipe 25 is a pipe that connects the intake pipe 75 and the canister 20. Ends of the purge pipes 24 and 25 on the canister 20 side are connected to the upper surface of the housing 22 so as to communicate with the housing space of the adsorbent 21 (inside of the housing 22).

The evaporated fuel gas generated inside the fuel tank 6 is introduced into the housing 22 of the canister 20 through the first purge pipe 24, and is adsorbed (collected) by the adsorbent 21. The adsorbed evaporated fuel gas is introduced into the intake pipe 75 through the second purge pipe 25, and is supplied to the engine 5 through the intake pipe 75. In other words, the canister 20 is a housing structure having a housing space for the evaporated fuel gas (fluid) to be supplied to the engine 5.

As shown in FIGS. 5 and 7, the canister 20 is fixed to the battery case 81 via a bracket 131. The bracket 131 is attached along a left side surface of the bottom container portion 87 so as to support the canister 20 in the vicinity of a left side of the bottom container portion 87 in the battery case 81. Specifically, the bracket 131 includes an upper fixing portion 132 fixed to the bottom wall 83 of the battery case 81, a lower fixing portion 134 fixed to the bottom container portion 87 of the battery case 81 at a position separated downward from the upper fixing portion 132, a back receiving portion 133 formed between the upper and lower fixing portions 132 and 134, and a lower end support portion 135 protruding outward (leftward) from a lower end of the lower fixing portion 134. The upper fixing portion 132 and the lower fixing portion 134 are fixed to the battery case 81 via a fastening member such as a bolt or an adhesive. The back receiving portion 133 is a portion that comes into contact with a back surface of the canister 20, and is formed so as to slightly protrude toward the canister 20 side (left side) than the lower fixing portion 134. The lower end support portion 135 is a portion that supports the canister 20 from below, and is formed to protrude further to the left than the back receiving portion 133.

The back receiving portion 133 has holding pieces 133*a* on both sides in a width direction (vehicle body front-rear direction) thereof. The holding pieces 133*a* are disposed along both side surfaces of the canister 20, that is, front and rear surfaces of the canister 20 in the vehicle body. The canister 20 is sandwiched between the holding pieces 133*a* of the back receiving portion 133 and is supported by the lower end support portion 135 from below, so that the canister 20 is fixed at a fixed position on the bracket 131. In the present embodiment, as a means for fixing the canister 20 to the bracket 131, a rubber band 137 that connects both the holding pieces 133*a* of the back receiving portion 133 to each other is used. The rubber band 137 is attached so as to wind around the canister 20, thereby fixing the canister 20 to the bracket 131.

The canister 20 is disposed below the bottom wall 83 of the battery case 81 with a distance therebetween. In other words, the canister 20 is disposed so as to be separated from the battery 80 with the bottom wall 83 interposed therebetween.

As shown in FIG. 5, the canister 20 is disposed in a posture inclined toward a front side. That is, the canister 20 is disposed in a posture of being inclined such that an upper end thereof is positioned forward of a lower end thereof, in other words, in a posture of being inclined such that the upper surface of the housing 22 faces upward and forward. In order to obtain such an inclined posture of the canister 20, the bracket 131 is formed such that the holding piece 133*a* is inclined to the front side with respect to a vertical plane and the lower end support portion 135 is inclined with respect to a horizontal plane.

The inclined posture of the canister 20 described above corresponds to an extension direction of the first and second purge pipes 24 and 25 connected to the upper surface of the housing 22 of the canister 20. That is, the first and second purge pipes 24 and 25 are routed so as to extend forward while being curved from the upper surface of the housing 22 of the canister 20. The canister 20 is disposed in a posture inclined to the front side such that the upper surface of the housing 22 of the canister 20 faces the extension direction (front side) of the purge pipes 24 and 25.

Next, a positional relation between the canister 20 and the reservoir tank 30 and the vehicle body 1 will be described. The canister 20 and the reservoir tank 30 are disposed between the pivot shaft 45 and the rear wheel 3 so as to partially overlap the swing arms 14 in a side view. That is, the canister 20 and the reservoir tank 30 are disposed such that lower portions of the canister 20 and the reservoir tank 30 enter between the pair of left and right arm members 121 of the swing arms 14 in a state of being disposed side by side in the vehicle width direction. In other words, the lower portion of the canister 20, the lower portion of the reservoir tank 30, and the pair of arm members 121 are disposed so as to overlap one another in a side view.

In the plan view shown in FIG. 8, the canister 20 and the reservoir tank 30 are disposed between the pivot shaft 45 and the cross member 122. That is, the canister 20 and the reservoir tank 30 are disposed behind the pivot shaft 45 so as to overlap the pivot shaft 45 as viewed in the front-rear direction, and are disposed in front of the cross member 122 so as to overlap the cross member 122 as viewed in the front-rear direction. In other words, the lower portions of the canister 20 and the reservoir tank 30 are disposed in a region surrounded by the pair of arm members 121, the pivot shaft 45, and the cross member 122.

Here, a position (height) of the illustrated swing arm 14 in the upper-lower direction is a position under predetermined conditions such that the rear wheel 3 is in contact with the ground and a rider is not riding. On the other hand, the swing arms 14 receive a weight of the rider or a load applied during traveling, and swing upward or downward with respect to the illustrated positions. In the present embodiment, positions of the canister 20 and the reservoir tank 30 are set such that the swing arms 14 partially overlap the canister 20 and the reservoir tank 30 in a side view wherever the swing arms 14 are positioned within such a swing range.

Operation and Effect

As described above, in the present embodiment, the canister 20 that adsorbs evaporated fuel gas and the reservoir tank 30 that stores the cooling water W are disposed between the pivot shaft 45 and the rear wheel 3 and at positions overlapping the swing arms 14 in a side view. According to such a configuration, there is an advantage an increase in a size of the motorcycle can be prevented while appropriately protecting the canister 20 and the reservoir tank 30 as housing structures.

That is, in the present embodiment, since the canister 20 is disposed between the pivot shaft 45 and the rear wheel 3, a dead space between the pivot shaft 45 and the rear wheel 3 can be effectively used as a disposition space for the canister 20. Accordingly, it is not necessary to secure a dedicated space for disposing the canister 20, and it is possible to prevent the motorcycle from increasing in size due to the securing of the dedicated space. In addition, since the canister 20 is disposed at a position overlapping the swing arms 14 in a side view, in other words, between the pair of left and right arm members 121 of the swing arms 14, the canister 20 can be protected by the swing arms 14 (arm members 121) covering sides of the canister 20, and the possibility of a foreign matter or the like colliding with the canister 20 from the side can be reduced.

In the present embodiment, since the reservoir tank 30 is disposed at the same position as the canister 20 (between the pair of arm members 121), the dead space between the pivot shaft 45 and the rear wheel 3 can be effectively used as a disposition space for the reservoir tank 30, and the reservoir tank 30 can be appropriately protected by the swing arms 14.

In particular, in the present preferred embodiment, since the battery case 81 that supports the battery 80 is disposed between the engine 5 and the rear wheel 3, and the reservoir tank 30 is housed in the bottom container portion 87 which is a part of the battery case 81, it is possible to protect the reservoir tank 30 more appropriately. That is, since the reservoir tank 30 is housed in the bottom container portion 87, the bottom container portion 87 can be used as a protective cover that covers the reservoir tank 30, and the possibility of a foreign matter or the like colliding with the reservoir tank 30 can be further reduced. In addition, since a part of the battery case 81 supporting the battery 80 is used as a housing portion (bottom container portion 87) of the reservoir tank 30, it is not necessary to separately provide a housing portion of the reservoir tank 30, and the structure can be further simplified.

Although the canister 20 is not provided with covers (corresponding to the bottom container portion 87) for directly protecting the canister 20, unlike the reservoir tank 30, since the canister 20 is protected by at least the swing arms 14, no particular problem occurs even if there are no covers. Accordingly, in the present embodiment, since a dedicated cover is not prepared for the canister 20, it is possible to reduce the number of components and to reduce a weight of the motorcycle.

In the present embodiment, the canister 20 is disposed on the outer side of the bottom container portion 87, the reservoir tank 30 is disposed on the inner side of the bottom container portion 87, and the canister 20 and the reservoir tank 30 are disposed adjacent to each other in the vehicle width direction. According to such a configuration, the canister 20 and the reservoir tank 30 can be collectively disposed between the pivot shaft 45 and the rear wheel 3 while disposition locations of the canister 20 and the reservoir tank 30 are dispersed to the inside and the outside of the bottom container portion 87, and a more efficient layout can be achieved. In this case, although the canister 20 is positioned outside the bottom container portion 87, since the swing arm 14 is present outside the canister 20 in the vehicle width direction (on the left side in the present embodiment), the canister 20 can be prevented from being visually recognized from the side by the swing arm 14, and the appearance of the motorcycle can be improved.

In the present embodiment, since the canister 20 and the reservoir tank 30 are disposed at a relatively low position between the pivot shaft 45 and the rear wheel 3 (or between the pair of arm members 121), the center of gravity of the vehicle body 1 can be lowered. That is, since the cooling water W is stored inside the reservoir tank 30, a weight of the reservoir tank 30 including the cooling water W is not small. On the other hand, evaporated fuel gas (gas) is housed in the canister 20, since the adsorbent 21 that adsorbs the evaporated fuel gas has a specific gravity larger than that of the gas, a weight of the canister 20 including the adsorbent 21 cannot be ignored. In the present embodiment, since the disposition locations where the canister 20 and the reservoir tank 30 are disposed are sufficiently low, the center of gravity of the vehicle body 1 can be lowered, and the traveling stability of the motorcycle can be enhanced.

Moreover, in the present preferred embodiment, since a material of the reservoir tank 30 and a material of the housing 22 of the canister 20 are both resins, it is possible to reduce a total weight of the motorcycle including the canister 20 and the reservoir tank 30. Even if the material of the canister 20 (housing 22) and the material of the reservoir tank 30 are resins, since the canister 20 and the reservoir tank 30 are surrounded by the swing arms 14 and the like, the canister 20 and the reservoir tank 30 are less likely to be damaged. That is, according to the present embodiment, it is possible to appropriately protect the canister 20 and the reservoir tank 30 while reducing the weight of the motorcycle.

In the present embodiment, the purge pipes 24 and 25 are connected to the upper surface of the housing 22 of the canister 20 (see FIG. 5). According to such a configuration, compared with a case in which the purge pipes 24 and 25 are connected to a lower surface of the housing 22, for example, the possibility of an obstacle on a road surface colliding with the purge pipes 24 and 25 can be sufficiently reduced, and the purge pipes 24 and 25 can be appropriately protected.

In the present embodiment, the purge pipes 24 and 25 are routed so as to extend forward while being curved from the upper surface of the housing 22, and the canister 20 is disposed in a posture inclined toward the front side (see FIG. 5). According to such a configuration, since the upper surface of the housing 22 faces upward and forward, curved angles of the purge pipes 24 and 25 can be reduced, and the purge pipes 24 and 25 can be connected to the canister 20 without difficulty.

In the present embodiment, the canister 20 is disposed outside the bottom container portion 87 and below the bottom wall 83 of the battery case 81 (see FIGS. 5 and 7). According to such a configuration, even if evaporated fuel gas leaks from the canister 20, it is possible to prevent the leaked evaporated fuel gas from entering the inside of the battery case 81 (above the bottom wall 83). As a result, the possibility of the evaporated fuel gas reaching the vicinity of an electrode portion of the battery 80 can be sufficiently reduced, and the safety can be improved.

In the present embodiment, the cooling water hose 34 is connected to a bottom portion of the reservoir tank 30, and the extending portion 88 that covers the periphery of the cooling water hose 34 is formed on the lower side of the bottom container portion 87 (see FIGS. 6 and 9). According to such a configuration, the cooling water hose 34 can be appropriately protected by the extending portion 88. In particular, since the extending portion 88 is formed so as to cover the portion of the cooling water hose 34 that protrudes downward from the bottom portion 87a of the bottom container portion 87 from the rear side and both the left and right sides, the cooling water hose 34 can be appropriately protected from a foreign matter or the like that is likely to fly mainly from the rear side in accordance with the rotation of the rear wheel 3.

In the present embodiment, the reservoir tank 30 is disposed at a position deviated to the right side (opposite side of the side stand 19) in the battery case 81, and the replenishment port portion 32 of the reservoir tank 30 is formed so as to be inclined to the right side (see FIG. 7). According to such a configuration, since the upper end of the replenishment port portion 32 is sufficiently separated to the right side from the vehicle width center CL, an operation of replenishing the cooling water W through the replenishment port portion 32 can be easily performed from the right side of the vehicle body 1. In particular, when parking using the side stand 19, the vehicle body 1 is inclined to the left side, and as a result, the upper end (cap 33) of the replenishment port portion 32 is easily visible from the right side of the vehicle body 1, and thus the replenishment operation of the cooling water W can be performed more easily.

In the present embodiment, the rear portions of the swing arm 14 and rear portions (rear pipes 44) of the vehicle body frame 11 are coupled to each other via the rear suspension 17. According to such a configuration, unlike a case in which the lower end portion of the rear suspension 17 is connected to a front portion of the swing arm 14, for example, there is no concern that the rear suspension 17 interferes with the canister 20 or the bottom container portion 87 (or the reservoir tank 30 inside the bottom container portion 87), and the rear suspension 17 can be appropriately attached to the vehicle body 1 while securing the disposition spaces for the canister 20 and the reservoir tank 30.

Modification

In the above embodiment, although the canister 20 for housing (adsorbing) evaporated fuel gas to be supplied to the engine 5 and the reservoir tank 30 for housing the cooling water W to be supplied to the engine 5 are disposed between the pair of left and right arm members 121 of the swing arms 14, in other words, at positions overlapping the swing arms 14 in a side view, another housing structure that houses a fluid other than the evaporated fuel gas and the cooling water W may be disposed between the pair of arm members 121.

In the above embodiment, although the canister 20 and the reservoir tank 30 are disposed side by side in a vehicle width direction between the pair of arm members 121, the canister 20 and the reservoir tank 30 may be disposed side by side in a front-rear direction. Only one of the canister 20 and the reservoir tank 30 may be disposed between the pair of arm members 121.

In the above embodiment, although the battery case 81 is provided between the engine 5 and the rear wheel 3, and the battery 80 (auxiliary device) is mounted on the battery case 81, auxiliary devices other than the battery 80 may be mounted on the battery case 81 (case body). That is, the case body provided between the engine 5 and the rear wheel 3 may be any case body that supports some auxiliary devices, and the auxiliary device supported by the case body is not limited to a battery.

In the above embodiment, although the reservoir tank 30 is housed in the bottom container portion 87 which is a part of the battery case 81, the bottom container portion 87 may be omitted, and the reservoir tank 30 may be disposed outside the battery case 81.

In the above embodiment, although swing arms including the pair of left and right arm members 121 are provided as the swing arms 14 connecting the pivot shaft 45 and the rear wheel 3, the swing arm may be a cantilever type swing arm including a single arm member provided on only one of the left and right sides. In this case, the canister 20 or the reservoir tank 30 as a housing structure may be disposed at a position overlapping the single arm member in a side view.

In the above embodiment, although the canister 20 and the reservoir tank 30 overlap the swing arms 14 in a side view regardless of the position of the swing arm 14 within the swing range, when the swing arm 14 is positioned at or near a lower swing limit position, the canister 20 and the reservoir tank 30 may not overlap the swing arms 14 in a side view. That is, the canister 20 and the reservoir tank 30 may be disposed so as to overlap the swing arms 14 in a side view at least in a state in which the swing arm 14 swings upward.

In the above embodiment, an example in which the present disclosure is applied to a motorcycle that is a type of saddle-ride type vehicle has been described, but the present disclosure is also applicable to other saddle-ride type vehicles such as three-wheeled vehicles and four-wheeled buggies.

SUMMARY

The above embodiment and the modification of the embodiment are summarized as follows.

A saddle-ride type vehicle includes a rear wheel, a vehicle body frame including a pivot shaft extending in a vehicle width direction, a swing arm connecting the pivot shaft and the rear wheel, and a housing structure having a fluid housing space therein. The housing structure is disposed between the pivot shaft and the rear wheel and at a position overlapping the swing arm in a side view.

In this aspect, since the housing structure is disposed between the pivot shaft and the rear wheel, a dead space between the pivot shaft and the rear wheel can be effectively used as a disposition space for the housing structure. Accordingly, it is not necessary to secure a dedicated space for disposing the housing structure, and it is possible to prevent a motorcycle from increasing in size due to the securing of the space. In addition, since the housing structure is disposed at a position overlapping the swing arm in a side view, the housing structure can be protected by the swing arm covering the side of the housing structure, and the possibility of a foreign matter or the like colliding with the housing structure from the side can be reduced.

Preferably, the swing arm includes a pair of left and right arm members extending from two locations of the pivot shaft in the vehicle width direction toward the rear wheel, and the housing structure is disposed between the pair of arm members.

In this aspect, the housing structure can be appropriately protected by the arm members on both left and right sides of the housing structure.

The saddle-ride type vehicle may further include a driving source that rotationally drives the rear wheel. In this case, it is preferable that the housing structure houses a fluid to be supplied to the driving source therein.

In this aspect, it is possible to appropriately protect the housing structure that houses the fluid used in the driving source.

The housing structure may include a canister that adsorbs an evaporated component of fuel to be supplied to the driving source.

In this aspect, the dead space between the pivot shaft and the rear wheel can be effectively used as the disposition space for the canister, and the canister can be appropriately protected by the swing arm.

The saddle-ride type vehicle may further include a purge pipe connected to an upper surface of the canister. In this case, it is preferable that the purge pipe is routed so as to extend in a predetermined direction while being curved from the upper surface of the canister, and it is preferable that the canister is disposed in a posture inclined in the predetermined direction.

In this aspect, since the purge pipe is connected to the upper surface of the canister, the possibility of an obstacle on a road surface colliding with the purge pipe can be sufficiently reduced and the purge pipe can be appropriately protected, as compared with a case in which the purge pipe is connected to a lower surface of the canister, for example. In addition, since the canister is disposed in a posture inclined in an extension direction of the purge pipe, a curved angle of the purge pipe can be reduced, and the purge pipe can be connected to the canister without difficulty.

The housing structure may be a reservoir tank that stores cooling water to be supplied to the driving source.

In this aspect, the dead space between the pivot shaft and the rear wheel can be effectively used as a disposition space for the reservoir tank, and the reservoir tank can be appropriately protected by the swing arm.

The saddle-ride type vehicle may further include a case body that supports an auxiliary device disposed between the driving source and the rear wheel. In this case, it is preferable that the case body includes a tank housing portion having a bottomed cylindrical shape that houses the reservoir tank.

In this aspect, since the reservoir tank is housed in the tank housing portion, the tank housing portion can be used as a protective cover that covers the reservoir tank, and the possibility of a foreign matter or the like colliding with the reservoir tank can be further reduced. Moreover, since a part of the case body that supports an auxiliary device is used as a housing portion (tank housing portion) of the reservoir tank, it is not necessary to separately provide a housing portion of the reservoir tank, and the structure can be further simplified.

In the aspect in which the reservoir tank is housed in the tank housing portion, the saddle-ride type vehicle may further include a canister that adsorbs an evaporation component of fuel to be supplied to the driving source. In this case, it is preferable that the canister is disposed so as to be adjacent to the reservoir tank in the vehicle width direction outside the tank housing portion.

In this aspect, the canister and the reservoir tank can be collectively disposed between the pivot shaft and the rear wheel while the disposition locations of the canister and the reservoir tank are dispersed to the inside and the outside of the tank housing portion, and a more efficient layout can be achieved.

Preferably, the saddle-ride type vehicle further includes a rear suspension that connects a rear portion of the swing arm and a rear portion of the vehicle body frame.

In this way, when the rear suspension is coupled to the rear portion of the swing arm, unlike a case in which the rear suspension is coupled to a front portion of the swing arm, for example, there is no concern that the rear suspension interferes with the housing structure, and the rear suspension can be appropriately attached to the vehicle body while securing the disposition space of the housing structure.

What is claimed is:

1. A saddle-ride type vehicle comprising:
   a rear wheel;
   a driving source configured to rotationally drives the rear wheel;
   a fuel tank located above the driving source;
   a vehicle body frame including a pivot shaft extending in a vehicle width direction;
   a swing arm connecting the pivot shaft and the rear wheel; and
   a housing structure having a housing space of fluid inside the housing structure, wherein
   the housing structure includes a canister that adsorbs an evaporated component of fuel to be supplied to the driving source;
   the canister is located behind the driving source;
   the canister is disposed between the pivot shaft and the rear wheel and at a position overlapping the swing arm in a side view of the saddle-ride type vehicle.

2. The saddle-ride type vehicle according to claim 1, wherein
the swing arm includes a pair of left and right arm members extending from two locations of the pivot shaft in the vehicle width direction toward the rear wheel, and
the housing structure is a reservoir tank that stores cooling water to be supplied to the driving source; and
the canister and the reservoir tank are each disposed between the pair of arm members.

3. The saddle-ride type vehicle according to claim 2, further comprising:
a case body that supports the housing structure, wherein the case body includes:
a bottom container portion located between the pair of left and right arm members as view in a front-rear direction; and
a bottom wall located above the swing arm and extending from an upper portion of the bottom container portion at least in the vehicle width direction.

4. The saddle-ride type vehicle according to claim 3, wherein the reservoir tank includes:
an accommodated portion that is accommodated by the bottom container portion; and
a supported portion extending outward in the vehicle width direction as view in a front-rear direction to be supported by the bottom wall, and
wherein the supported portion is provide with a replenishment port portion for a replenishment operation of the cooling water into the reservoir tank.

5. The saddle-ride type vehicle according to claim 1, wherein
the housing structure houses the fluid to be supplied to the driving source inside the housing structure.

6. The saddle-ride type vehicle according to claim 5, wherein
the housing structure is a reservoir tank that stores cooling water to be supplied to the driving source.

7. The saddle-ride type vehicle according to claim 6, further comprising:
a case body that supports an auxiliary device disposed between the driving source and the rear wheel, wherein
the case body includes a tank housing portion having a bottomed cylindrical shape, the tank housing portion housing the reservoir tank.

8. The saddle-ride type vehicle according to claim 7, wherein the canister is disposed adjacently to the reservoir tank in the vehicle width direction outside the tank housing portion.

9. The saddle-ride type vehicle according to claim 5, further comprising:
a reservoir tank configured to store cooling water to be supplied to the driving source; and
a cooling water hose connected to a bottom portion of the tank body, wherein
the reservoir tank and the canister are disposed side by side in the vehicle width direction.

10. The saddle-ride type vehicle according to claim 1, further comprising:
a purge pipe connected to an upper surface of the canister, wherein
the purge pipe is routed to extend in a predetermined direction while being curved from the upper surface of the canister, and
the canister is disposed in a posture inclined in the predetermined direction.

11. The saddle-ride type vehicle according to claim 1, further comprising:
a rear suspension that connects a rear portion of the swing arm and a rear portion of the vehicle body frame.

12. The saddle-ride type vehicle according to claim 1, wherein
a front end of the housing structure is positioned rearward from a rear end of the pivot shaft in a front-rear direction of the saddle-ride type vehicle.

13. The saddle-ride type vehicle according to claim 1, wherein
the housing structure is a reservoir tank that stores cooling water to be supplied to the driving source, and
the canister is disposed adjacently to the reservoir tank in the vehicle width direction.

14. The saddle-ride type vehicle according to claim 1, further comprising:
a case body that supports an auxiliary device disposed between the driving source and the rear wheel, wherein
the canister is located below the case body.

15. A saddle-ride type vehicle comprising:
a rear wheel;
a vehicle body frame including a pivot shaft extending in a vehicle width direction;
a swing arm connecting the pivot shaft and the rear wheel; and
a housing structure having a housing space of fluid inside the housing structure; and
a case body that supports the housing structure, wherein
the housing structure is disposed between the pivot shaft and the rear wheel and at a position overlapping the swing arm in a side view of the saddle-ride type vehicle, and
the case body includes:
a bottom container portion located between a pair of left and right arm members as view in a front-rear direction; and
a bottom wall located above the swing arm and extending from an upper portion of the bottom container portion at least in the vehicle width direction.

16. A saddle-ride type vehicle comprising:
a rear wheel;
a vehicle body frame including a pivot shaft extending in a vehicle width direction;
a swing arm connecting the pivot shaft and the rear wheel; and
a case body that supports an auxiliary device disposed between a driving source and the rear wheel, wherein
a housing structure is disposed between the pivot shaft and the rear wheel and at a position overlapping the swing arm in a side view of the saddle-ride type vehicle, and
the case body includes:
a bottom container portion located between a pair of left and right arm members as view in a front-rear direction; and
a bottom wall located above the swing arm and extending from an upper portion of the bottom container portion at least in the vehicle width direction.

* * * * *